UNITED STATES PATENT OFFICE.

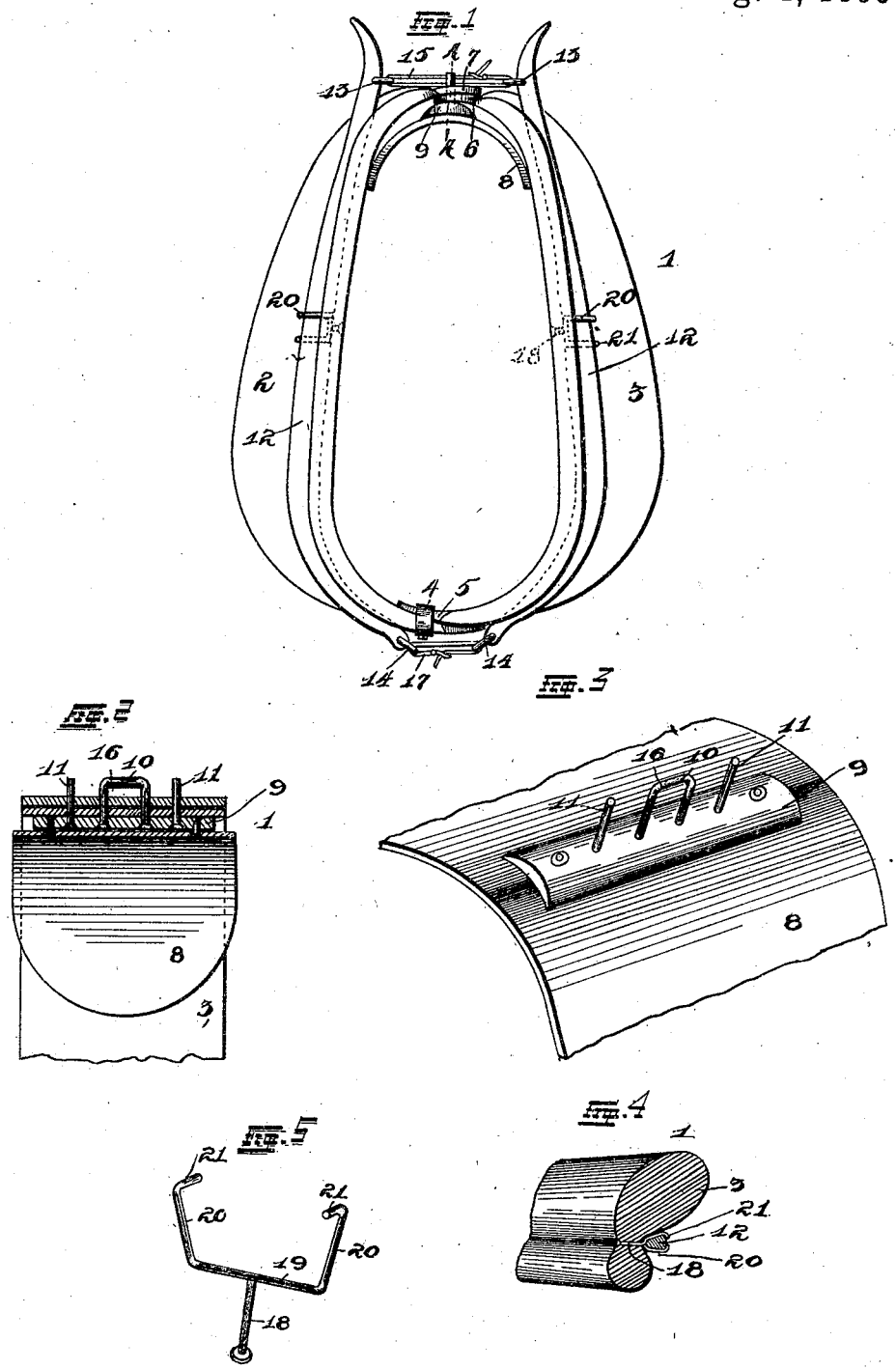

EDWIN R. WILLIAMSON, OF CHAIN OF ROCKS, MISSOURI.

HORSE-COLLAR.

SPECIFICATION forming part of Letters Patent No. 502,543, dated August 1, 1893.

Application filed March 27, 1893. Serial No. 467,741. (No model.)

*To all whom it may concern:*

Be it known that I, EDWIN R. WILLIAMSON, of the city of Chain of Rocks, county of Lincoln, State of Missouri, have invented certain new and useful Improvements in Horse-Collars, of which the following is a full, clear, and exact description, reference being had to the accompanying drawings, forming a part hereof.

My invention relates to improvements in "horse collars" and consists in the novel arrangement and combination of parts, as will be more fully hereinafter described and designated in the claim.

The object of my improvement lies in the provision of suitable securing devices to hold the two members of the collar together and the hames normally in connection therewith.

In the drawings: Figure 1 is a detail front elevation of my complete invention. Fig. 2 is an enlarged vertical section taken on the line A—A in Fig. 1. Fig. 3 is a detail perspective view of one of the parts of my improvement. Fig. 4 is a perspective sectional view showing the manner of securing the hame to the collar. Fig. 5 is an enlarged perspective view of the hame-fastening.

Referring to the drawings: 1 indicates a complete collar consisting of two members 2 and 3. The member 2 is provided with a tapered lower extremity to which is secured a strap 4, extending entirely around the same and adapted to receive the tapered lower end 5 of the section 3. The upper extremity of the section 3 is provided with an underlapping leather strip 6 provided with a series of openings hereinafter described and adapted to fit under a similar strip 7 upon the upper extremity of the section 2 of the collar. A piece of leather 8 is provided with a rounded metallic plate 9 secured thereto, said plate 9 having an upwardly projecting inverted U-shaped device 10, and two upwardly extending pins 11, one upon each side of said projections 10 and in alignment therewith. The leather flaps 6 and 7 are provided with openings through which the projections 10 and 11 are adapted to pass, as particularly shown in Fig. 2.

The hames 12 are of the usual well known construction, being provided near their upper extremities with rings 13 and near their lower extremities with rings 14, both of the rings 13 adapted to be secured together to hold the hames in position by a strap 15 which passes under the upper cross arm 16 of the projection 10, as shown in Fig. 1. A strap 17 is adapted to be placed through the two wings 14 to secure the lower extremities of the hames.

I furthermore provide securance for the hames by the use of a device especially illustrated in Fig. 4 and 5 wherein it will be seen that it consists of a pivot rod 18 having a cross arm 19 with upwardly projecting arms 20 having inwardly projecting extensions 21. The rod 18 is secured through the collar in any desirable manner and the hame placed in position between the arms 20, and the extensions 21 are then bent over the same to hold it in securance with the collar.

It is immaterial which way the collar is opened, whether at the top or bottom, perhaps the lower construction being the simpler in operation as it is only necessary to loosen the strap 17 and withdraw the tapered end 5 out of the strap 4 and the collar can be placed upon the animal's neck or removed therefrom.

The flaps 6 and 7 are provided with a series of openings necessary to allow the passage of the projections 10 and 11, in order that the collar may be adjusted to different widths.

The leather flap 8 rests upon the upper side of the animal's neck, any suitable and desirable padding being inserted under the same to prevent the causing of sores or other ailments upon the animal's neck.

It will be seen from the above description that I have constructed a very durable and improved device for the normal securance of the two portions of the collar in order to enable the ready removal of the hames and collar and at the same time producing a collar adjustable to different sizes.

Having fully described my invention, what I claim is—

An improvement in horse collars comprising the two members of said collar, means for holding the lower tapered extremities in connection with each other, said members readily detachable at their lower extremities, under and over lapping flaps upon the upper extremities, a separable flap provided with projections adapted to engage in openings in the flaps upon the extremities of the members, the hames adapted to be normally held in connection with the members of the collar and adapted to be held together by straps connecting the upper ends of same through one of the projections upon the separable flap, and straps holding the lower ends of said hames together, substantially as set forth.

In testimony whereof I affix my signature in presence of two witnesses.

EDWIN R. WILLIAMSON.

Witnesses:
HERBERT S. ROBINSON,
ALFRED A. EICKS.